United States Patent
Sun et al.

(10) Patent No.: US 9,622,200 B2
(45) Date of Patent: Apr. 11, 2017

(54) SYNCHRONIZATION PREAMBLE TRANSMISSION METHOD, SYNCHRONIZATION METHOD, DEVICE AND SYSTEM

(75) Inventors: Changyin Sun, Shenzhen (CN); Huiying Fang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 393 days.

(21) Appl. No.: 13/809,110

(22) PCT Filed: Oct. 8, 2010

(86) PCT No.: PCT/CN2010/077598
§ 371 (c)(1),
(2), (4) Date: Jan. 8, 2013

(87) PCT Pub. No.: WO2012/003671
PCT Pub. Date: Jan. 12, 2012

(65) Prior Publication Data
US 2013/0107871 A1    May 2, 2013

(30) Foreign Application Priority Data
Jul. 9, 2010    (CN) .......................... 2010 1 0231524

(51) Int. Cl.
*H04W 56/00*    (2009.01)
*H04L 27/26*    (2006.01)
*H04W 92/10*    (2009.01)

(52) U.S. Cl.
CPC ........... *H04W 56/00* (2013.01); *H04L 27/261* (2013.01); *H04L 27/2655* (2013.01); *H04W 56/0015* (2013.01); *H04W 92/10* (2013.01)

(58) Field of Classification Search
None
See application file for complete search history.

(56) References Cited

U.S. PATENT DOCUMENTS

2010/0246508 A1* 9/2010 Chang et al. ................. 370/329
2010/0309849 A1* 12/2010 Park et al. .................... 370/328
(Continued)

FOREIGN PATENT DOCUMENTS

| CN | 101420261 A | 4/2009 |
|----|-------------|--------|
| CN | 101420402 A | 4/2009 |

(Continued)

OTHER PUBLICATIONS

International Search Report mailed on Apr. 28, 2011 in PCT/CN2010/077598 in 3 pages.

*Primary Examiner* — Chi H Pham
*Assistant Examiner* — Ronald H Davis
(74) *Attorney, Agent, or Firm* — Knobbe, Martens, Olson & Bear, LLP

(57) ABSTRACT

A synchronization preamble transmission method, a synchronization method, a device and a system are disclosed in the disclosure. The method includes: transmitting synchronization preambles in a superframe, the synchronization preambles comprise one Primary Preamble (P-Preamble) and two Secondary-Preambles (S-Preambles), wherein the P-Preamble carries system bandwidth information and the S-Preambles carry cell/sector Identification (ID) information. The disclosure reaches the effect of reducing the overhead of Synchronization Channel (SCH) on the basis of ensuring the performance of synchronization access.

12 Claims, 4 Drawing Sheets

(56) References Cited

U.S. PATENT DOCUMENTS

2011/0007690 A1* 1/2011 Chang et al. .................. 370/328
2011/0064032 A1* 3/2011 Sun et al. ..................... 370/328
2012/0015645 A1* 1/2012 Moon et al. ............... 455/422.1

FOREIGN PATENT DOCUMENTS

| CN | 101635983 A | 1/2010 | | |
|---|---|---|---|---|
| CN | 101662303 A | 3/2010 | | |
| WO | WO/2009/132502 | * | 11/2009 | ............. H04L 27/26 |
| WO | WO/2010/064865 | * | 6/2010 | ............... H04B 7/24 |

* cited by examiner

SYNCHRONIZATION PREAMBLE TRANSMISSION METHOD, SYNCHRONIZATION METHOD, DEVICE AND SYSTEM

CROSS-REFERENCE TO RELATED APPLICATIONS

This application is the U.S. National Phase application under 35 U.S.C. §371 of International Application PCT/CN2010/077598, filed Oct. 8, 2010, which claims priority to Chinese Application 201010231524.3, filed Jul. 9, 2010.

FIELD OF THE INVENTION

The disclosure relates to the communication field, and in particular to a synchronization preamble transmission method, a synchronization method, a device and a system.

BACKGROUND OF THE INVENTION

As a multi-carrier transmission mode, Orthogonal Frequency Division Multiplexing (OFDM) reduces the sensibility of a system to multipath fading channel frequency selectivity by converting a data stream transmitted at a high rate into a group of data streams transmitted in parallel at a low rate while the introduction of cyclic prefix further improves the Inter-symbol Interference (ISI) resistance of the system. Besides, characteristics including high bandwidth efficiency and easy implementation etc. enable OFDM technology to be applied more and more widely in the radio communication field. For example, Wireless Local Area Network (WLAN) systems, 802.16e systems based on Orthogonal Frequency-Division Multiple Access (OFDMA), and the next generation 802.16m systems of 802.16e etc. are systems based on OFDM technology.

For a mobile communication system, a Mobile Station (MS) is accessed to a network usually by a Synchronization Channel (SCH), and related systems of the current system are transmitted by using preambles in the SCH according to the following steps.

1) time and frequency synchronization.
2) cell Identifier (ID) detection.
3) broadcast message reading.

Through the steps above, the MS starts subsequent access processes according to information in the broadcast message.

In the mobile communication system, the access of the MS may be divided into an initial access process and a non-initial access process, wherein the initial access refers to a process in which the MS is powered on and accessed to a system while the non-initial access process refers to an access switching process, wherein an important index of the access process is the access time. The shorter the access time is, the higher the system performance will be. However, the access process needs to be implemented by the SCH which occupies certain resources.

In the conventional art, synchronization preambles comprise one Primary-Preamble (P-Preamble) and three Secondary-Preambles (S-Preambles) respectively carried on four radio frames of a superframe, thus causing relatively large overhead of SCH during a synchronization process.

SUMMARY OF THE INVENTION

The disclosure provides a synchronization preamble transmission method, a synchronization method, a device and a system to solve the problem of relatively large SCH overhead during a synchronization process.

To realize the purpose above, a synchronization preamble transmission method is provided according to an aspect of the disclosure.

The synchronization preamble transmission method according to the disclosure includes that: transmitting synchronization preambles in a superframe, wherein the synchronization preambles comprise one Primary Preamble (P-Preamble) and two Secondary-Preambles (S-Preambles), wherein the P-Preamble carries system bandwidth information and the S-Preambles carry cell/sector Identification (ID) information.

Preferably, the step of transmitting the synchronization preambles in the superframe comprises: transmitting the synchronization preambles on four radio frames of the superframe according to one mode of: transmitting the S-Preamble on a first radio frame, transmitting the P-Preamble on a second radio frame and transmitting the S-Preamble on a third radio frame; and transmitting the S-Preamble on the first radio frame, transmitting the P-Preamble on the third radio frame and transmitting the S-Preamble on a fourth radio frame.

Preferably, the P-Preamble and/or the S-Preamble are/is located on a first symbol of a radio frame.

To realize the purpose above, a synchronization method is further provided according to another aspect of the disclosure.

The synchronization method according to the disclosure includes: receiving synchronization preambles in a superframe, wherein the synchronization preambles comprise one Primary Preamble (P-Preamble) and two Secondary-Preambles (S-Preambles), wherein the P-Preamble carries system bandwidth information and the S-Preambles carry cell/sector Identification (ID) information; performing a detection of the P-Preamble and obtaining system bandwidth information carried in the P-Preamble; performing a detection of the S-Preamble and obtaining the cell/sector ID information carried in the S-Preambles; and performing a synchronization according to the system bandwidth information and the cell/sector ID information.

Preferably, the step of receiving the synchronization preambles in the superframe comprises: receiving the synchronization preambles on four radio frames of the superframe according to one mode of: receiving the S-Preamble on a first radio frame; receiving the P-Preamble on a second radio frame and receiving the S-Preamble on a third radio frame; and receiving the S-Preamble on the first radio frame, receiving the P-Preamble on the third radio frame and receiving the S-Preamble on a fourth radio frame.

Preferably, the P-Preamble and/or the S-Preamble are/is located on a first symbol of a radio frame.

To realize the purpose above, a control station is provided according to a third aspect of the disclosure.

The control station according to the disclosure comprises: a transmitting module, configured to transmit synchronization preambles in a superframe, the synchronization preambles comprise one P-Preamble and two S-Preambles, wherein the P-Preamble carries system bandwidth information and the S-Preambles carry cell/sector Identification (ID) information.

Preferably, the transmitting module, configured to transmits the synchronization preambles on four radio frames of the superframe according to one mode of: transmitting the S-Preamble on a first radio frame, transmitting the P-Preamble on a second radio frame and transmitting the S-Preamble on a third radio frame; and transmitting the S-Preamble on the first radio frame, transmitting the P-Preamble on the third radio frame and transmitting the S-Preamble on a fourth radio frame.

To realize the purpose above, a terminal is provided according to a fourth aspect of the disclosure.

The terminal according to the disclosure comprises: a receiving module, configured to receive synchronization preambles, wherein the synchronization preambles comprise one P-Preamble and two S-Preambles, wherein the P-Preamble carries system bandwidth information and the S-Preambles carry cell/sector Identification (ID) information; a P-Preamble detecting module, configured to detect the P-Preamble; a first obtaining module, configured to obtain the system bandwidth information carried in the P-Preamble; an S-Preamble detecting module, configured to detect the S-Preamble; a second obtaining unit, configured to obtain the cell/sector ID information carried in the S-Preamble; and a synchronization module, configured to perform synchronization according to the system bandwidth information and the cell/sector ID information.

To realize the purpose above, a synchronization preamble transmission system is provided according to a fifth aspect of the disclosure.

The synchronization preamble transmission system according to the disclosure comprises the above mentioned control station and the above mentioned terminal.

By means of the disclosure, synchronization preambles is transmitted in a superframe, wherein the synchronization preambles comprise one P-Preamble and two S-Preambles, the problem of relatively large SCH overhead during a synchronization process is solved, and the effect of reducing the overhead of SCH is reached on the basis of ensuring the performance of synchronization access.

BRIEF DESCRIPTION OF THE DRAWINGS

The accompanying drawings illustrated here provide further understanding to the disclosure and constitute a part of the application. The exemplary embodiments of the disclosure and the illustrations thereof are used for explaining the disclosure, instead of constituting an improper limitation to the disclosure. In the accompanying drawings.

DETAILED DESCRIPTION OF THE EMBODIMENTS

The disclosure will be described in details below with reference to the accompanying drawings and in combination with the embodiments. It should be noted that, if there is no conflict, the embodiments in the application and the characteristics in the embodiments can be combined with one another.

Figure 1:
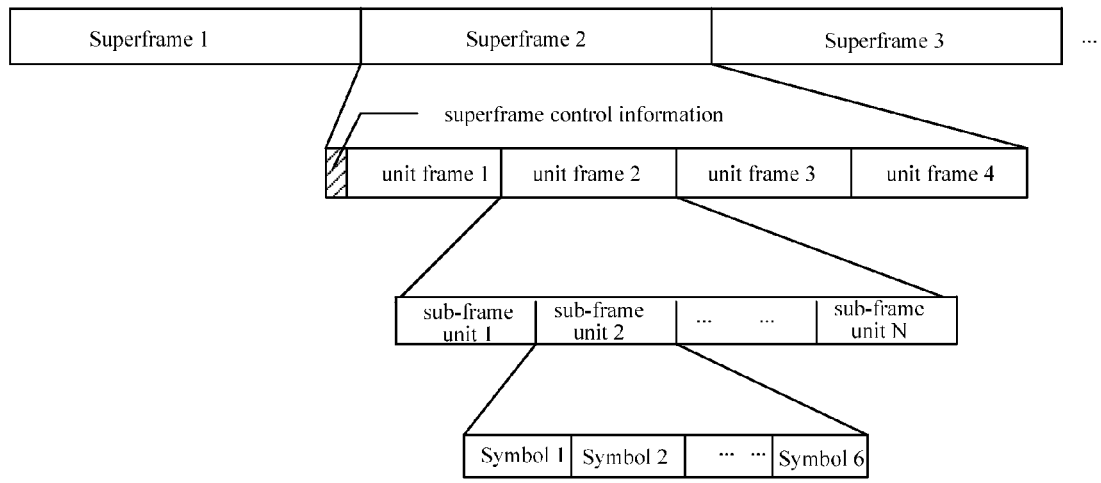
FIG. 1 is a structural diagram of a superframe according to the conventional art.

Synchronization preambles in the embodiments below of the disclosure are all transmitted based on superframes. FIG. 1 is a structural diagram of a superframe for transmitting synchronization preambles according to the conventional art. The superframe comprises four radio frames and superframe control information is located on several symbols at the beginning of the superframe. A radio frame comprises eight sub-frames. The sub-frames are divided into downlink sub-frames and uplink sub-frames and can be configured according to a system. Each sub-frame comprises six OFDM symbols.

Embodiment 1

In the present embodiment, a synchronization preamble transmission method is provided, and the method comprises: transmitting the synchronization preambles in a superframe, wherein the synchronization preambles comprises one P-Preamble and two S-Preambles, wherein the P-Preamble carries system bandwidth information and the S-Preambles carry cell/sector ID information.

Through the step above, the transmitted synchronization preambles comprise one P-Preamble and two S-Preambles, thus configuration of one S-Preamble is reduced to avoid the problem of relatively large SCH overhead during a synchronization process in the conventional art, and further the effect of reducing the overhead of SCH is reached on the basis of ensuring the performance of synchronization access.

A preferred embodiment of the step above of transmitting the synchronization preambles in the superframe will be described below. The synchronization preambles are transmitted on four radio frames of the superframe according to one mode of: transmitting the synchronization preambles on four radio frames of the superframe according to one mode of: transmitting the S-Preamble on a first radio frame, transmitting the P-Preamble on a second radio frame and transmitting the S-Preamble on a third radio frame; and transmitting the S-Preamble on the first radio frame, transmitting the P-Preamble on the third radio frame and transmitting the S-Preamble on a fourth radio frame. By using the transmitting mode of the present preferred embodiment, the P-Preamble is transmitted at the middle position of a radio frame while the S-Preambles is transmitted at the two sides of the P-Preamble, thus providing two opportunities for a terminal to demodulate the S-Preamble, so as to improve the S-Preamble demodulation accuracy, and improve the synchronization accuracy.

Preferably, the P-Preamble and/or the S-Preamble are/is located on a first symbol of a radio frame. The P-Preamble and/or the S-Preamble are/is limited on the first symbol of a radio frame in the present preferred embodiment, which is beneficial for the terminal to locate and receive the P-Preamble and the S-Preamble, thus shortening the access time while improving the synchronization efficiency.

Embodiment 2

The present embodiment integrates the first embodiment and the preferred embodiments therein. In the present embodiment, a synchronization preamble transmission method is provided.

Figure 2:
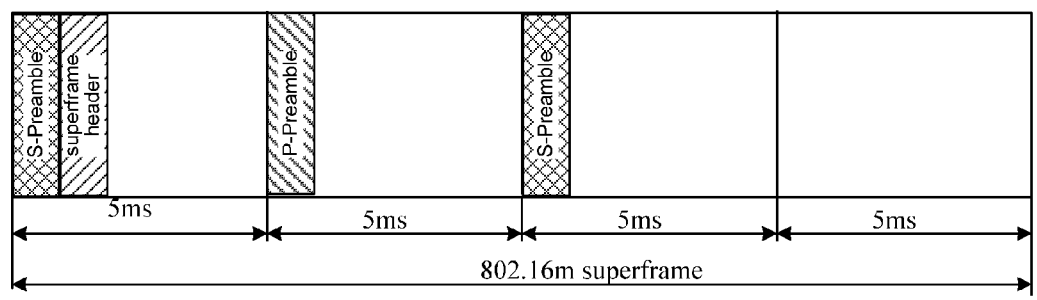
FIG. 2 is the first schematic diagram of a P-Preamble and S-Preambles according to an embodiment of the disclosure.

FIG. 2 is the first schematic diagram of a P-Preamble and S-Preambles according to an embodiment of the disclosure. As shown in FIG. 2, an SCH (synchronization preamble)

comprises a primary SCH (P-Preamble) and two secondary SCHs (S-Preamble). FIG. 2 shows a superframe header which carries system control information. The superframe header is transmitted on a first sub-frame of a first radio frame in a superframe. The P-Preamble is transmitted one time in the superframe, and the P-Preamble is transmitted on the first symbol of a second 802.16m radio frame in the superframe. The S-Preamble is transmitted twice, and the S-Preamble is transmitted in an 802.16m superframe on the first symbols of a first 16m radio frame and a third 16m radio frame in the superframe.

Figure 3:
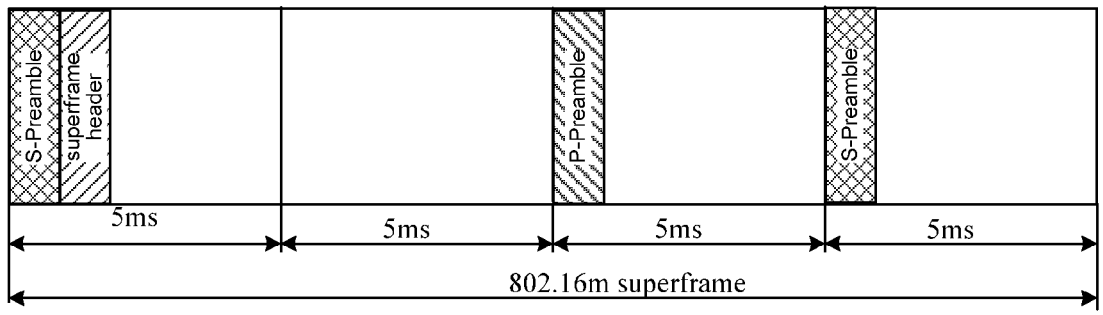
FIG. 3 is the second schematic diagram of a P-Preamble and S-Preambles according to an embodiment of the disclosure.

FIG. 3 is the second schematic diagram of a P-Preamble and S-Preambles according to an embodiment of the disclosure. As shown in FIG. 3, the P-Preamble is transmitted one time in an 802.16m superframe on the first symbol of a third 802.16m radio frame in the superframe. The S-Preamble is transmitted twice in the 802.16m superframe on the first symbols of a first 16m radio frame and a fourth 16m radio frame in the superframe.

Through the present preferred embodiment, the P-Preamble is transmitted on the first symbol of the second or the third radio frame in the superframe, and the P-Preamble is transmitted at the first and third positions or the first and fourth positions in the superframe, the problem of relatively large SCH overhead during a synchronization process is solved, and the effect of reducing the overhead of SCH on the basis of ensuring the performance of synchronization access is reached.

Embodiment 3

Figure 4:
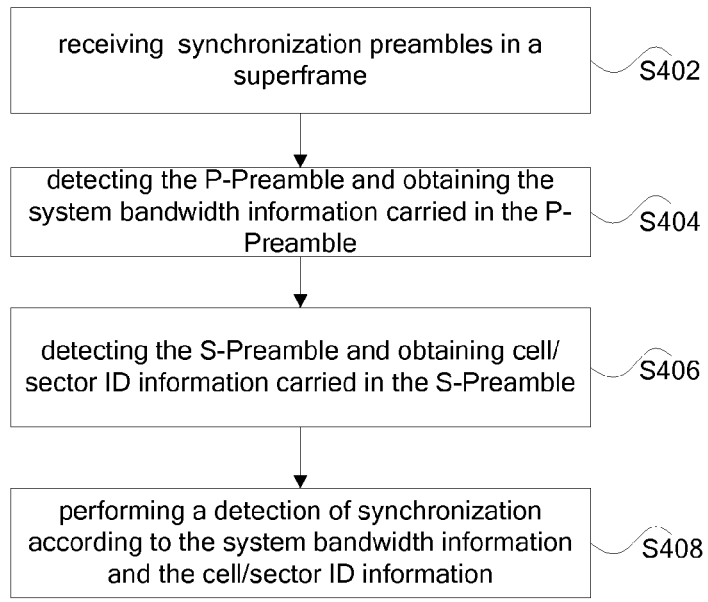
FIG. 4 is a flowchart of a synchronization method according to an embodiment of the disclosure.

In the present embodiment, a synchronization method is provided. FIG. 4 is a flowchart of a synchronization method according to an embodiment of the disclosure. As shown in FIG. 4, the following steps are included.

Step S402: synchronization preambles is received in a superframe, wherein the synchronization preambles comprise one P-Preamble and two S-Preambles; the P-Preamble carries system bandwidth information and the S-Preambles carry cell/sector ID information.

Step S404: the P-Preamble is detected and the system bandwidth information carried in the P-Preamble is obtained.

Step S406: the S-Preamble is detected and cell/sector ID information carried in the S-Preamble is obtained.

Step S408: a detection of synchronization is performed according to the system bandwidth information and the cell/sector ID information.

Through the steps above, the synchronization is performed according to the detection results of detecting the P-Preamble and the two S-Preambles. Therefore, only the two S-Preambles are demodulated on the basis of ensuring the performance of synchronization access, the access time is shortened and the overhead of SCH is reduced.

A preferred embodiment of Step 402 of receiving the synchronization preambles on the superframe will be described below. In the present preferred embodiment, the synchronization preambles are received on four radio frames of the superframe according to one mode of: receiving the S-Preamble on a first radio frame; receiving the P-Preamble on a second radio frame and receiving the S-Preamble on a third radio frame; and receiving the S-Preamble on the first radio frame, receiving the P-Preamble on the third radio frame and receiving the S-Preamble on a fourth radio frame. By using the receiving methods of the present preferred embodiment, the P-Preamble is received at the middle position of a radio frame while the S-Preamble is received at the two sides of the P-Preamble, thus providing two opportunities for a terminal to receive and demodulate the S-Preamble, so as to improve the S-Preamble demodulation accuracy, and improve the synchronization accuracy.

Preferably, the P-Preamble and/or the S-Preamble are/is located on a first symbol of a radio frame. The P-Preamble and/or the S-Preamble are/is limited on the first symbol of a radio frame in the present preferred embodiment, which is beneficial for the terminal to locate and receive the P-Preamble and the S-Preamble, thus shortening the access time while improving the synchronization efficiency.

Embodiment 4

The disclosure further provides a preferred embodiment which combines the technical schemes of multiple embodiments above.

Figure 5:
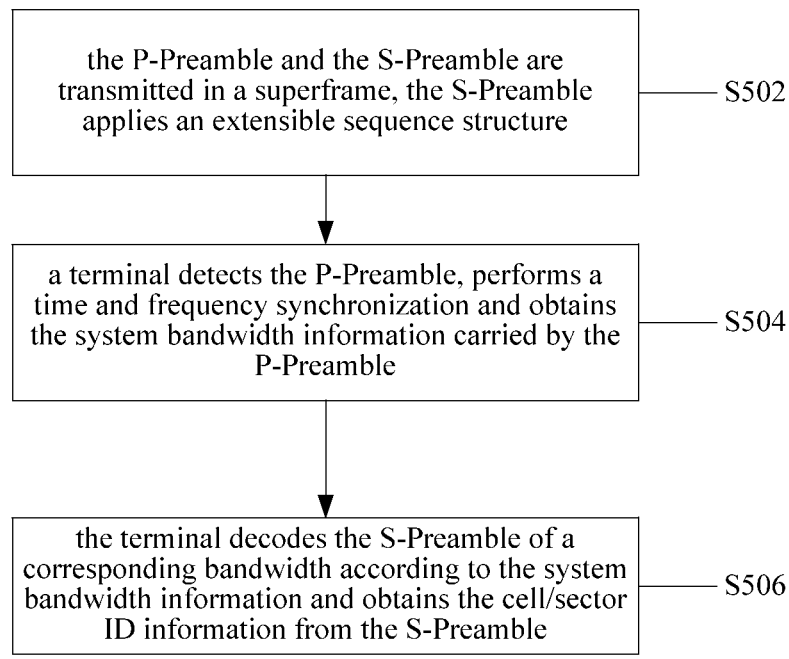
FIG. 5 is a flowchart of a synchronization method according to a preferred embodiment of the disclosure.

FIG. 5 is a flowchart of a synchronization method according to a preferred embodiment of the disclosure. Description is made in details below in combination with FIG. 5.

Step S502: the P-Preamble and the S-Preamble are transmitted in a superframe, wherein the P-Preamble includes system bandwidth information and the S-Preamble carries cell/sector ID information; the P-Preamble and the S-Preamble are transmitted according to the following sequence: "S-Preamble—P-Preamble—S-Preamble—X (X indicates that a preamble is not transmitted on a corresponding radio frame.)" or "S-Preamble—X—P-Preamble—S-Preamble", and the specific transmission positions are as shown in FIG. 2 or FIG. 3.

Step S504: a terminal detects the P-Preamble, performs a time and frequency synchronization and obtains the system bandwidth information carried by the P-Preamble.

Step S506: the terminal decodes the S-Preamble of a corresponding bandwidth according to the system bandwidth information and obtains the cell/sector ID information from the S-Preamble.

Embodiment 5

Figure 6:
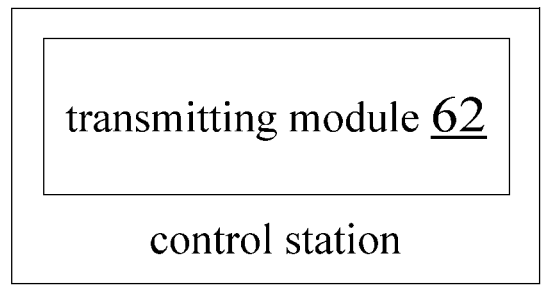
FIG. 6 is a structural diagram of a control station according to an embodiment of the disclosure.

The present embodiment integrates the first embodiment, the second embodiment and the preferred embodiments in the first and second embodiments. A control station is provided in the present embodiment. FIG. 6 is a structural diagram of a control station according to an embodiment of the disclosure. As shown in FIG. 6, the control station comprises: a transmitting module 62. The structure above is described in details below:

the transmitting module 62 is configured to transmit synchronization preambles in a superframe, the synchronization preambles comprise one P-Preamble and two S-Preambles, wherein the P-Preamble carries system bandwidth information and the S-Preambles carry cell/sector ID information.

Preferably, the transmitting module 62 is configured to transmit the synchronization preambles on four radio frames of the superframe according to one mode of: transmitting the S-Preamble on a first radio frame, transmitting the P-Preamble on a second radio frame and transmitting the S-Preamble on a third radio frame; and transmitting the S-Preamble on the first radio frame, transmitting the P-Preamble on the third radio frame and transmitting the S-Preamble on a fourth radio frame.

It should be noted that the control station can be a base station or a relay station in an actual system.

Embodiment 6

Figure 7:
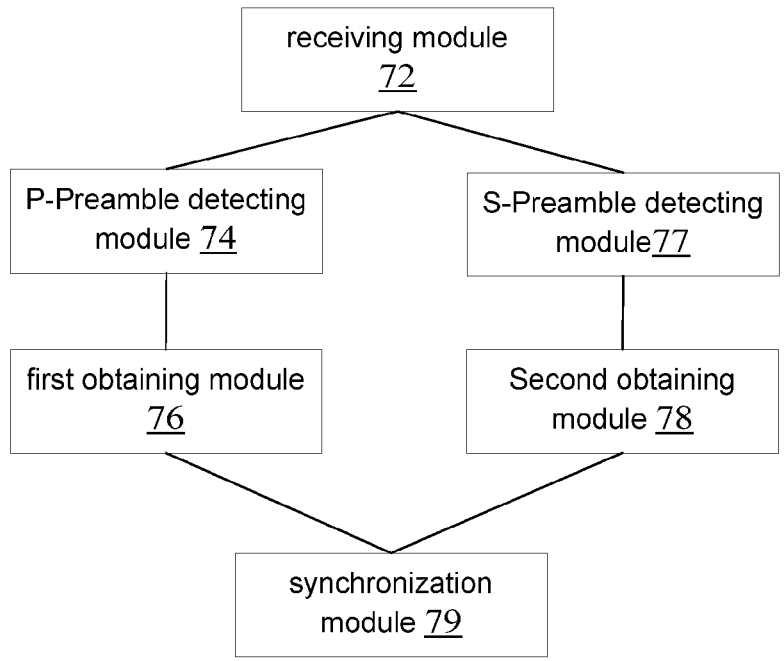
FIG. 7 is a structural diagram of a terminal according to an embodiment of the disclosure.

The present embodiment integrates the third embodiment and the preferred embodiments therein. A terminal is provided in the present embodiment. FIG. 7 is a structural diagram of a terminal according to an embodiment of the disclosure. As shown in FIG. 7, the terminal includes: a receiving module 72, a P-Preamble detecting module 74, a first obtaining module 76, an S-Preamble detecting module 77, a second obtaining unit 78 and a synchronization module 79. The structures above are described in details below:

the receiving module 72 is configured to receive synchronization preambles, wherein the synchronization preambles comprise one P-Preamble and two S-Preambles, wherein the P-Preamble carries system bandwidth information and the S-Preambles carry cell/sector ID information; the P-Preamble detecting module 74 is connected to the receiving module 72 and configured to detect the P-Preamble received by the receiving module 72; the first obtaining module 76 is connected to the P-Preamble detecting module 74 and configured to obtain the system bandwidth information carried in the P-Preamble detected by the P-Preamble detecting module 74; the S-Preamble detecting module 77 is connected to the receiving module 72 and configured to detect the S-Preamble received by the receiving module 72; the second obtaining unit 78 is connected to the S-Preamble detecting module 77 and configured to obtain the cell/sector ID information carried in the S-Preamble obtained by the S-Preamble detecting module 77; the synchronization module 79 is connected to the first obtaining module 76 and the second obtaining unit 78, and configured to perform synchronization according to the system bandwidth information obtained by the first obtaining module 76 and the cell/sector ID information obtained by the second obtaining unit 78.

Embodiment 7

Figure 8:
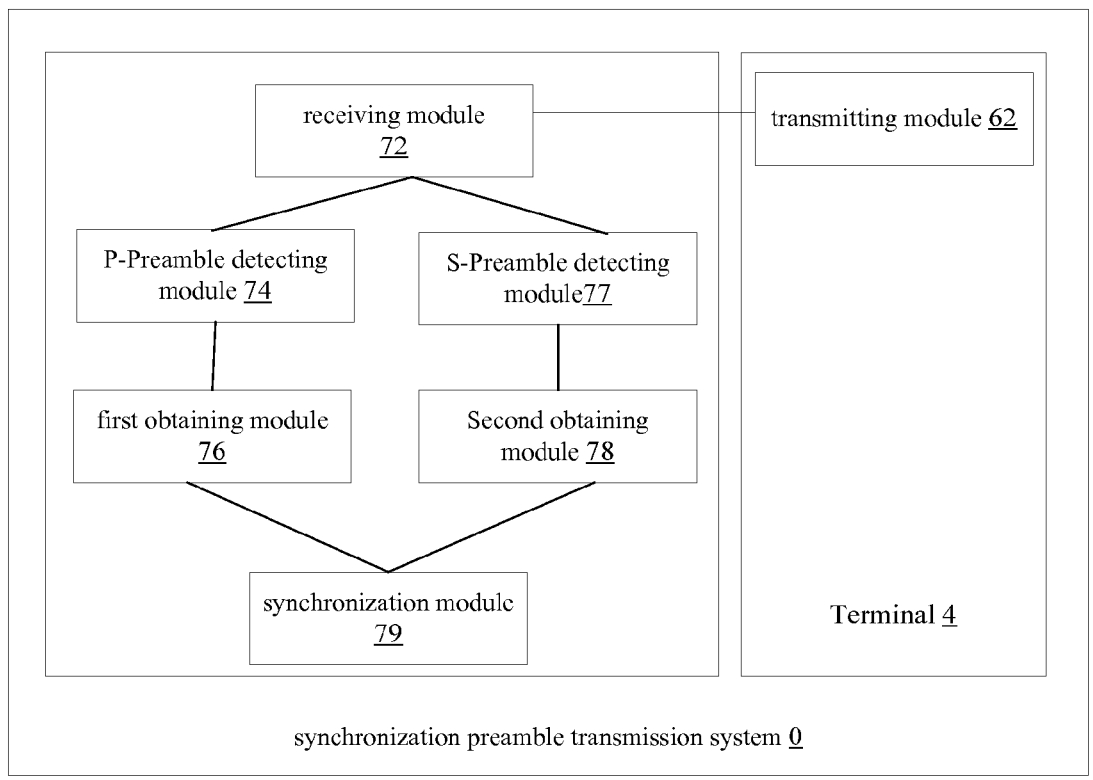
FIG. 8 is a structural diagram of a synchronization preamble transmission system according to an embodiment of the disclosure.

The present embodiment integrates the fifth embodiment, the sixth embodiment and the preferred embodiments in the fifth and sixth embodiments. A synchronization preamble transmission system is provided in the present embodiment. FIG. 8 is a structural diagram of a synchronization preamble transmission system according to an embodiment of the disclosure. As shown in FIG. 8, the synchronization preamble transmission system 0 includes a control station 2 and a terminal 4.

The structure of the controls station 2 is the same as that of the control station described by the fifth embodiment and the structure of the terminal 4 is the same as that of the terminal described by the sixth embodiment, which will not be repeated here.

To sum up, through the embodiments above of the disclosure, the transmitted synchronization preambles comprise one P-Preamble and two S-Preambles, thus the configuration of one S-Preamble is reduced to avoid the problem of relatively large SCH overhead during a synchronization process, and the effect of reducing the overhead of SCH on the basis of ensuring the performance of synchronization access is reached.

Obviously, those skilled in the art should understand that the modules or steps above of the disclosure may be implemented by general computing devices and centralized in a single computing device or distributed in a network consisting of multiple computing devices. Optionally, the modules or steps may be implemented by program codes executable by the computing devices, so that they may be stored in a storage device and executed by the computing device, and the steps as shown or as described may be performed according to sequences difference from those described herein in some cases, or they may be respectively made into integrated circuit modules, multiple modules or steps of them may be made into a single integrated circuit module. By doing so, the disclosure is not limited to any specific combination of hardware and software.

The above are only preferred embodiments of the disclosure and should not be used to limit the disclosure. For those skilled in the art, the disclosure may have various modifications and changes. Any modifications, equivalent replacements, improvements and the like within the spirit and principle of the disclosure shall fall within the scope of protection of the disclosure.

What is claimed is:

1. A synchronization preamble transmission method, comprising:
   transmitting, by a control station, synchronization preambles in a superframe, wherein the synchronization preambles comprise one Primary Preamble (P-Preamble) and two Secondary-Preambles (S-Preambles), wherein the P-Preamble carries system bandwidth information and the S-Preambles carry cell/sector Identification (ID) information;
   wherein the step of transmitting the synchronization preambles in the superframe comprises:
   transmitting, by the control station, the synchronization preambles on four radio frames of the superframe according to one mode of:
      transmitting the S-Preamble on a first radio frame, transmitting the P-Preamble on a second radio frame and transmitting the S-Preamble on a third radio frame; and
      transmitting the S-Preamble on the first radio frame, transmitting the P-Preamble on the third radio frame and transmitting the S-Preamble on a fourth radio frame;
   wherein the P-Preamble is detected by a terminal to perform a time and frequency synchronization and obtain the system bandwidth information carried by the P-Preamble; and the S-Preamble of a corresponding bandwidth is decoded by the terminal according to the system bandwidth information to obtain the cell/sector ID information from the S-Preamble.

2. The method according to claim 1, wherein the P-Preamble and/or the S-Preamble are/is located on a first symbol of a radio frame.

3. A synchronization method, comprising:
   receiving, by a terminal, synchronization preambles in a superframe, wherein the synchronization preambles comprise one Primary Preamble (P-Preamble) and two Secondary-Preambles (S-Preambles), wherein the P-Preamble carries system bandwidth information and the S-Preambles carry cell/sector Identification (ID) information; wherein the step of receiving, by the terminal, the synchronization preambles in the superframe comprise:
   receiving the synchronization preambles on four radio frames of the superframe according to one mode of:
   receiving the S-Preamble on a first radio frame; receiving the P-Preamble on a second radio frame and receiving the S-Preamble on a third radio frame; and
   receiving, by the terminal, the S-Preamble on the first radio frame, receiving the P-Preamble on the third radio frame and receiving the S-Preamble on a fourth radio frame;
   performing, by the terminal, a detection of the P-Preamble and obtaining system bandwidth information carried in the P-Preamble;

performing, by the terminal, a detection of the S-Preamble and obtaining the cell/sector ID information carried in the S-Preambles; and performing, by the terminal, a synchronization according to the system bandwidth information and the cell/sector ID information.

4. The method according to claim 3, wherein the P-Preamble and/or the S-Preamble are/is located on a first symbol of a radio frame.

5. The method according to claim 1, wherein the radio frames are downlink sub-frames.

6. The method according to claim 1, wherein the radio frames are uplink sub-frames.

7. A terminal, comprising a hardware processor configured to execute software programs, wherein the software programs comprise:

a receiving module, configured to receive synchronization preambles, wherein the synchronization preambles comprise one P-Preamble and two S-Preambles, wherein the P-Preamble carries system bandwidth information and the S-Preambles carry cell/sector Identification (ID) information; wherein the step of receiving the synchronization preambles in a superframe comprise:

receiving the synchronization preambles on four radio frames of the superframe according to one mode of:

receiving the S-Preamble on a first radio frame; receiving the P-Preamble on a second radio frame and receiving the S-Preamble on a third radio frame; and receiving the S-Preamble on the first radio frame, receiving the P-Preamble on the third radio frame and receiving the S-Preamble on a fourth radio frame;

a P-Preamble detecting module, configured to detect the P-Preamble;

a first obtaining module, configured to obtain the system bandwidth information carried in the P-Preamble;

an S-Preamble detecting module, configured to detect the S-Preamble;

a second obtaining module, configured to obtain the cell/sector ID information carried in the S-Preamble; and a synchronization module, configured to perform synchronization according to the system bandwidth information and the cell/sector ID information;

wherein the P-Preamble is detected by a terminal to perform a time and frequency synchronization and obtain the system bandwidth information carried by the P-Preamble; and the S-Preamble of a corresponding bandwidth is decoded by the terminal according to the system bandwidth information to obtain the cell/sector ID information from the S-Preamble.

8. A system, comprising a hardware processor configured to execute software programs, wherein the software programs comprise:

a transmitting module, configured to transmit synchronization preambles in a superframe, the synchronization preambles comprise one P-Preamble and two S-Preambles, wherein the P-Preamble carries system bandwidth information and the S-Preambles carry cell/sector Identification (ID) information; wherein the transmitting module, configured to transmits the synchronization preambles on four radio frames of the superframe according to one mode of:

transmitting the S-Preamble on a first radio frame, transmitting the P-Preamble on a second radio frame and transmitting the S-Preamble on a third radio frame; and transmitting the S-Preamble on the first radio frame, transmitting the P-Preamble on the third radio frame and transmitting the S-Preamble on a fourth radio frame;

wherein the P-Preamble is detected by a terminal to perform a time and frequency synchronization and obtain the system bandwidth information carried by the P-Preamble; and the S-Preamble of a corresponding bandwidth is decoded by the terminal according to the system bandwidth information to obtain the cell/sector ID information from the S-Preamble.

9. A synchronization preamble transmission system, comprising: the system according to claim 8 and a terminal.

10. The synchronization preamble transmission system according to claim 9, wherein the system is a base station.

11. The synchronization preamble transmission system according to claim 9, wherein the system is a relay station.

12. The system according to claim 8, wherein the superframe is an 802.16m superframe.

* * * * *